US012565883B2

(12) United States Patent
Xu et al.

(10) Patent No.: US 12,565,883 B2
(45) Date of Patent: Mar. 3, 2026

(54) ELECTRIC CYLINDER DRIVING DEVICE AND WALKING BEAM PUMPING UNIT INCLUDING ELECTRIC CYLINDER DRIVING DEVICE

(71) Applicant: SHANGHAI YINGLUO ELECTROMECHANICAL TECHNOLOGY CO., LTD, Shanghai (CN)

(72) Inventors: Jianxin Xu, Shanghai (CN); Dayong Zeng, Shanghai (CN); Yong Li, Shanghai (CN)

(73) Assignee: SHANGHAI YINGLUO ELECTROMECHANICAL TECHNOLOGY CO., LTD, Shanghai (CN)

( * ) Notice: Subject to any disclaimer, the term of this patent is extended or adjusted under 35 U.S.C. 154(b) by 203 days.

(21) Appl. No.: 18/529,088

(22) Filed: Dec. 5, 2023

(65) Prior Publication Data

US 2024/0110560 A1     Apr. 4, 2024

Related U.S. Application Data

(63) Continuation of application No. PCT/CN2021/081961, filed on Mar. 22, 2021.

(30) Foreign Application Priority Data

Mar. 19, 2021   (CN) .......................... 202110293327.2

(51) Int. Cl.
*F04B 47/02*        (2006.01)
*E21B 43/12*        (2006.01)
(Continued)

(52) U.S. Cl.
CPC .......... *F04B 47/022* (2013.01); *E21B 43/127* (2013.01); *F04B 17/03* (2013.01);
(Continued)

(58) Field of Classification Search
CPC ...... F04B 47/022; F04B 47/028; F04B 17/03; E21B 43/127; F16N 31/00; F16N 2013/063; H02K 5/124; H02K 7/06
See application file for complete search history.

(56) References Cited

U.S. PATENT DOCUMENTS

| | | | | |
|---|---|---|---|---|
| 2017/0137005 A1* | 5/2017 | Weh | ........................ | F04B 23/025 |
| 2019/0107105 A1* | 4/2019 | Doyle | .................. | F04B 47/145 |
| 2021/0039771 A1* | 2/2021 | Morisaki | ............. | F16H 25/2418 |

FOREIGN PATENT DOCUMENTS

CN        119084566 A  * 12/2024  ............. B08B 5/023

OTHER PUBLICATIONS

Translation of CN-119084566-A (Year: 2024).*

* cited by examiner

*Primary Examiner* — Charles G Freay
(74) *Attorney, Agent, or Firm* — Hemisphere Law, PLLC

(57) ABSTRACT

An electric cylinder driving device includes an electric cylinder outer tube, an electric cylinder inner tube, a ball screw, an electric cylinder piston, a ball screw nut and an elastic oil scraping device. The electric cylinder outer tube is sleeved on the electric cylinder inner tube. The ball screw nut is installed in an upper end of the electric cylinder inner tube. An end of the ball screw is movably connected in the electric cylinder outer tube, and another end of the ball screw matched with the ball screw nut is inserted into the electric cylinder inner tube. The electric cylinder piston is disposed between the electric cylinder outer tube and the electric cylinder inner tube. A lower end of the electric cylinder inner tube is provided with an oil pool. The elastic
(Continued)

oil scraping device is disposed between the electric cylinder piston and the electric cylinder outer tube.

20 Claims, 5 Drawing Sheets

(51) Int. Cl.

| | |
|---|---|
| *F04B 17/03* | (2006.01) |
| *F16N 31/00* | (2006.01) |
| *H02K 5/124* | (2006.01) |
| *H02K 7/06* | (2006.01) |
| *F16N 13/06* | (2006.01) |

(52) U.S. Cl.
CPC ............ *F04B 47/028* (2013.01); *F16N 31/00* (2013.01); *H02K 5/124* (2013.01); *H02K 7/06* (2013.01); *F16N 2013/063* (2013.01)

ELECTRIC CYLINDER DRIVING DEVICE AND WALKING BEAM PUMPING UNIT INCLUDING ELECTRIC CYLINDER DRIVING DEVICE

TECHNICAL FIELD

The disclosure relates to the technical field of petroleum equipment, and specifically to an electric cylinder driving device and a walking beam pumping unit including the electric cylinder driving device.

BACKGROUND

A walking beam pumping unit driven by an electric cylinder is applied in oil fields and includes a base, a frame, a horsehead, a walking beam, a driving electric cylinder, and a counterweight. The horsehead is powered by the driving electric cylinder. When a traditional driving electric cylinder is applied vertically, it is easy to cause the leakage of lubricating oil to the outside of the equipment. For exploitation of oil fields, good sealing of the equipment is required.

An existing driving electric cylinder, such as a Chinese patent with the application No. 201810655255.X (publication number CN110630223A), discloses a walking beam pumping unit driven by a servo motor. A servo electric cylinder driving device of the walking beam pumping unit includes a servo motor, a ball screw, an outer sleeve, an inner sleeve, and a ball nut. The ball screw is connected to the servo motor through a coupling, and the outer sleeve is sleeved on the inner sleeve. The inner sleeve is provided with the ball nut, and the ball nut is threaded with the ball screw. The inner sleeve is in a clearance fit with the outer sleeve. There is a certain distance between an outer wall of the inner sleeve and an inner wall of the outer sleeve, so that the outer sleeve can be sleeved on the inner sleeve, and the outer sleeve can slide relative to the inner sleeve to achieve the outer sleeve to lift and lower along the outer wall of the inner sleeve. A bearing is disposed on the ball screw, and the bearing is fixed on a bearing seat located on the inner wall of the outer sleeve. When the servo motor drives the ball screw to rotate along an up or down direction, the bearing drives the outer sleeve to lift or lower.

In order to meet requirements of lubrication and heat dissipation in the walking beam pumping unit, lubricating oil must be used cyclically to meet the requirements of lubrication and heat dissipation.

In the related art, lubricating oil in an oil pool in an inner sleeve is pumped to a bearing through an oil pump, the lubricating oil flows downwards along a ball screw after lubricating and cooling the bearing, one part of the lubricating oil flows back to the oil pool, and the other part of the lubricating oil flows to an inner wall of an outer sleeve and then leaks outside a driving electric cylinder.

SUMMARY

In order to reduce and prevent lubricating oil in a driving electric cylinder from leaking outside the driving electric cylinder, the disclosure provides an electric cylinder driving device and a walking beam pumping unit including the electric cylinder driving device. A purpose of the disclosure is to reduce the leakage of the lubricating oil in the driving electric cylinder and collect the leaked lubricating oil. The purpose of the disclosure is realized by the following technical solutions:

an electric cylinder driving device, includes: an electric cylinder outer tube, an electric cylinder inner tube, a ball screw, an electric cylinder piston, a ball screw nut, and an elastic oil scraping device; the electric cylinder outer tube is sleeved on the electric cylinder inner tube, the ball screw nut is installed in an upper end of the electric cylinder inner tube, an end of the ball screw is movably connected in the electric cylinder outer tube, and another end of the ball screw matched with the ball screw nut is inserted into the electric cylinder inner tube; the electric cylinder piston is disposed between the electric cylinder outer tube and the electric cylinder inner tube; the electric cylinder piston is fixed outside the upper end of the electric cylinder inner tube; a lower end of the electric cylinder inner tube is internally provided with an oil pool; the elastic oil scraping device is installed on the electric cylinder piston, and the elastic oil scraping device is disposed between the electric cylinder piston and an inner wall of the electric cylinder outer tube.

In some embodiments, the electric cylinder driving device further includes an oil collection device disposed on a lower end of the electric cylinder outer tube.

In some embodiments, the elastic oil scraping device includes an oil scraping ring. The electric cylinder piston defines an annular groove, the oil scraping ring is installed in the annular groove, and the oil scraping ring is attached to the inner wall of the electric cylinder outer tube.

In some embodiments, the electric cylinder piston defines an oil returning groove, and the oil returning groove penetrates through an inner side and an outer side of the electric cylinder piston. The electric cylinder inner tube defines an oil returning hole corresponding to the oil returning groove, the oil returning groove is connected to the oil pool through the oil returning hole, and the oil returning groove is disposed above the annular groove.

In some embodiments, the oil returning groove is disposed obliquely, and an end of the oil returning groove located at the outer side of the electric cylinder piston is higher than another end of the oil returning groove connected to the oil returning hole.

In some embodiments, the elastic oil scraping device further includes an elastic O-shaped ring, the elastic O-shaped ring is installed in the annular groove, and the oil scraping ring is sleeved on the elastic O-shaped ring.

In some embodiments, the oil collection device includes an oil receiving tray and an oil collection pot. The oil receiving tray is installed at the lower end of the electric cylinder outer tube. The oil receiving tray defines a central hole and an oil collection groove. The central hole is located in a middle of the oil receiving tray. The electric cylinder inner tube penetrates through the central hole in a clearance fit manner. The oil collection groove is axially disposed around the central hole; the oil collection pot is installed at a side of a lower end of the oil receiving tray. The oil collection groove is communicated with the oil collection pot.

In some embodiments, the oil collection pot is a vacuum pump filter.

In some embodiments, the oil receiving tray includes an annular slope structure disposed at an upper end of the central hole. A side of the annular slope structure near the electric cylinder inner tube is higher than another side of the annular slope structure near the oil collection groove.

A walking beam pumping unit includes a base, a frame, a horsehead, a walking beam, the electric cylinder driving device mentioned above, and a counterweight. The frame is installed on the base, and the frame is installed under a middle of the walking beam. The horsehead is installed at an end of the walking beam, the counterweight is installed at another end of the walking beam. The electric cylinder driving device is connected between the walking beam and the base. The electric cylinder driving device is configured to drive the horsehead installed at the end of the walking beam to move up and down.

Compared with related art, the disclosure has beneficial effects as follows.

1. By using the elastic oil scraping device and the oil collection device, the electric cylinder driving device of the disclosure can reduce or even avoid the problem that lubricating oil leaks from the inner wall of the electric cylinder outer tube.

2. The oil scraping ring will wear out during use, and the setting of the elastic O-shaped ring can compensate for a worn part of the oil scraping ring and improve a service life of the oil scraping ring.

3. The oil scraping ring can intercept the lubricating oil flowing between the electric cylinder piston and the inner wall of the electric cylinder outer tube, and the intercepted lubricating oil flows from the oil returning groove to the oil returning hole and finally returns to the oil pool, so that the lubricating oil is prevented from leaking between the electric cylinder piston and the electric cylinder outer tube.

4. The setting of the oil receiving tray and the oil collection pot can further collect lubricating oil that may leak between the electric cylinder piston and the electric cylinder outer tube, which plays a role in preventing leakage of the lubricating oil.

DESCRIPTION OF REFERENCE NUMERALS

1—electric cylinder outer tube; 2—electric cylinder inner tube; 3—ball screw; 4—electric cylinder piston; 5—ball screw nut; 6—bearing; 7—oil pool; 8—oil scraping ring; 9—annular groove; 10—oil returning groove; 11—oil returning hole; 12—elastic O-shaped ring; 13—oil receiving tray; 14—oil collection pot; 15—central hole; 16—oil collection groove; 17—annular slope structure; 18—base; 19—frame; 20—horsehead; 21—walking beam; 22—electric cylinder driving device; 23—counterweight.

DETAILED DESCRIPTION OF EMBODIMENTS

The technical solutions of the disclosure will be further described below in combination with specific embodiments.

Figure 1:
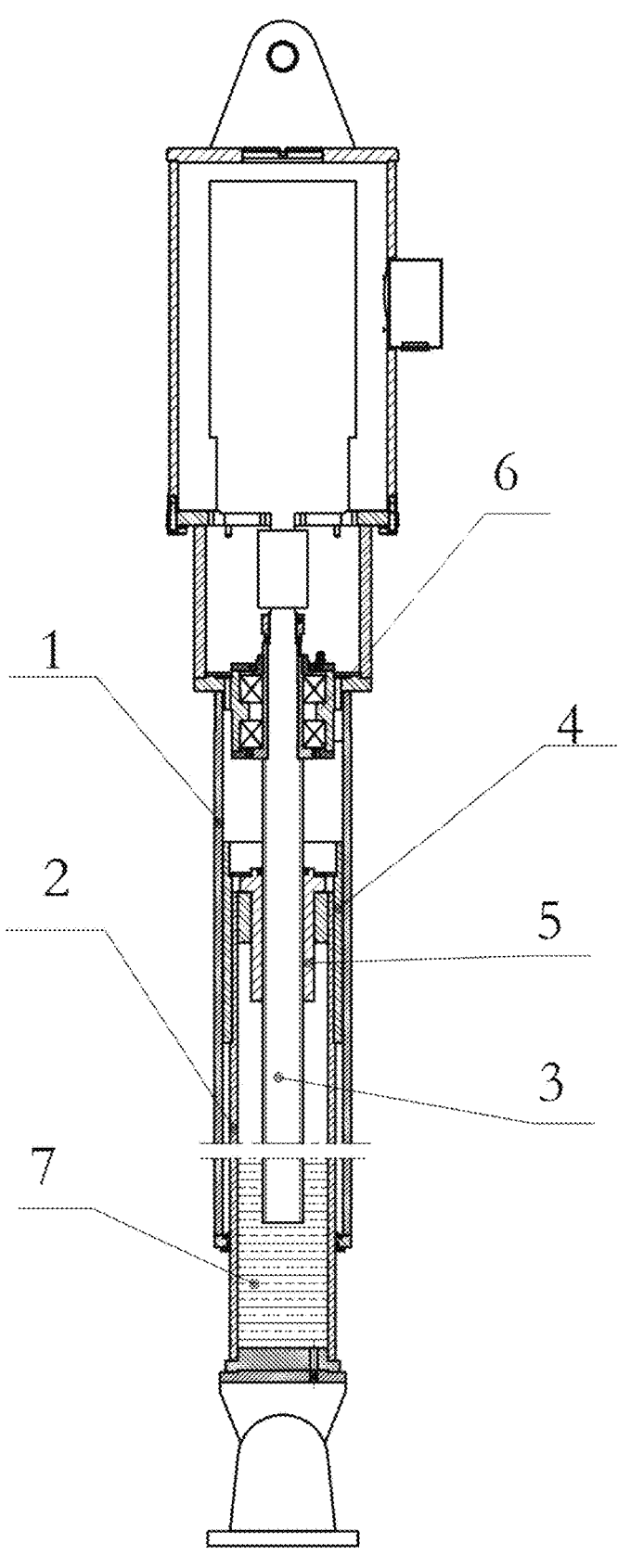
FIG. 1 illustrates a structural schematic diagram of an electric cylinder in the related art.
Figure 2:
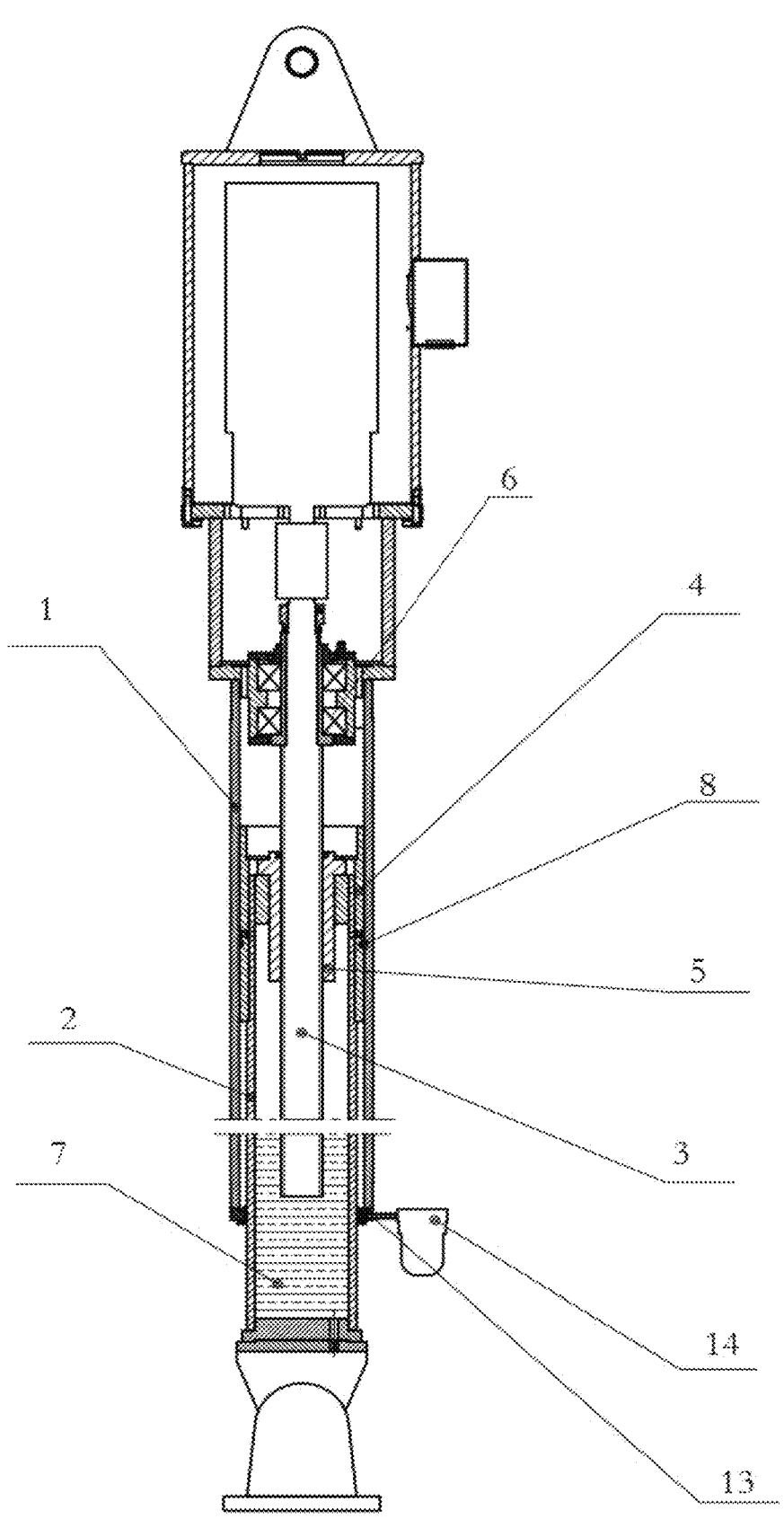
FIG. 2 illustrates a structural schematic diagram of an electric cylinder driving device of the disclosure.
Figure 3:
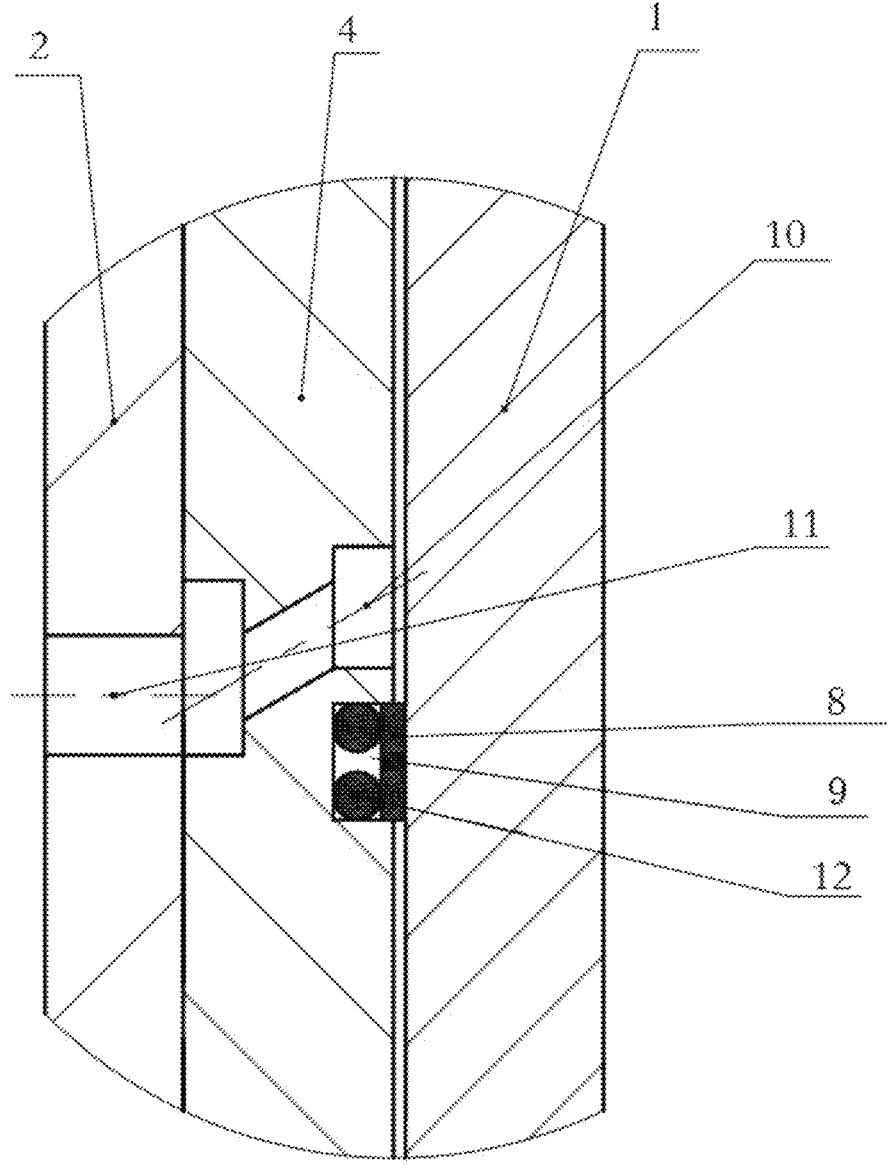
FIG. 3 illustrates an enlarged diagram of an elastic oil scraping device in FIG. 2.
Figure 4:
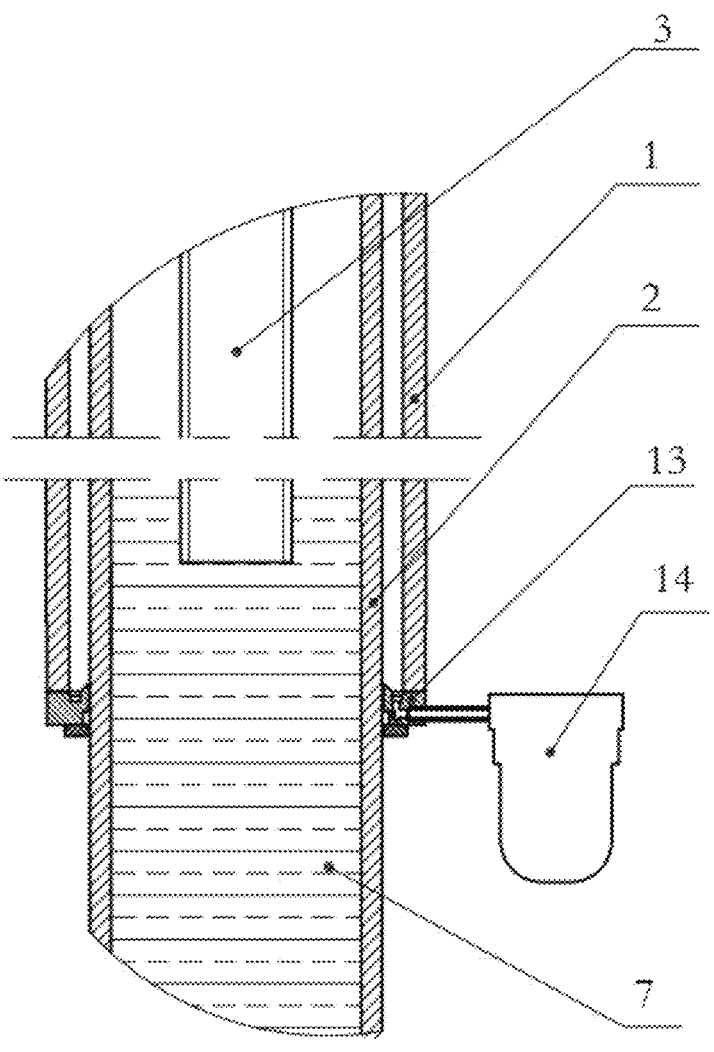
FIG. 4 illustrates a structural schematic diagram of an oil collection device of the disclosure.
Figure 5:
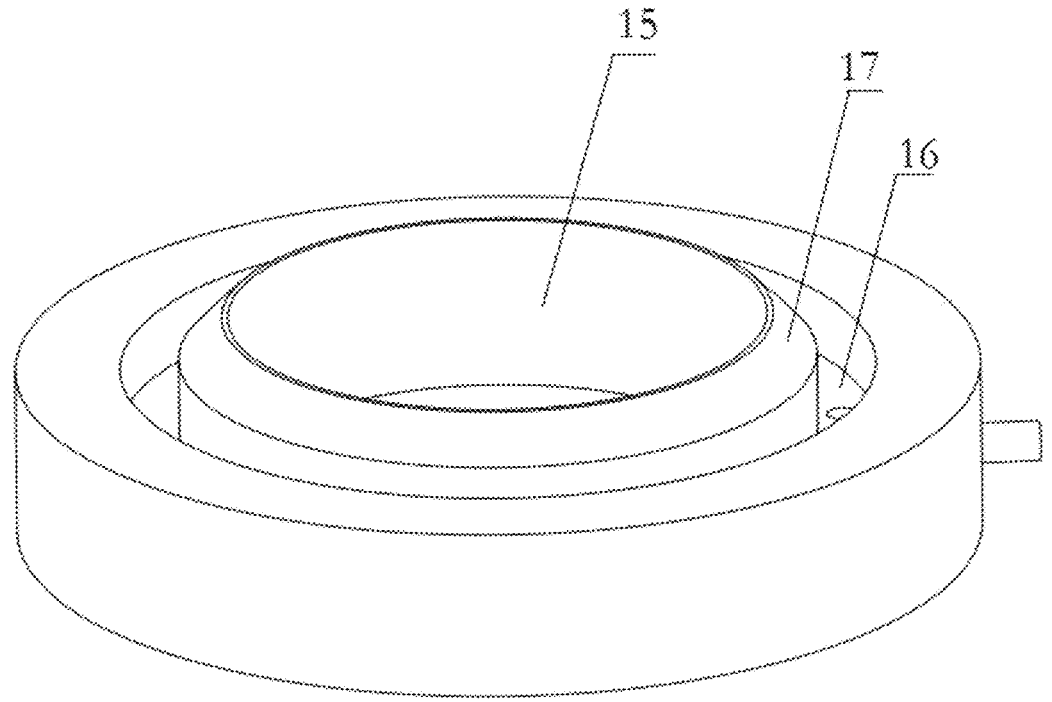
FIG. 5 illustrates a structural schematic diagram of an oil receiving tray of the disclosure.

A structure of an electric cylinder in the related art is shown in FIG. 1, the electric cylinder in the related art includes an electric cylinder outer tube 1, an electric cylinder inner tube 2, a ball screw 3, an electric cylinder piston 4, and a ball screw nut 5. The electric cylinder outer tube 1 is sleeved on the electric cylinder inner tube 2. The ball screw nut 5 is installed in an upper end of the electric cylinder inner tube 2. An upper end of the ball screw 3 is connected to a motor disposed at an upper end of the electric cylinder outer tube 1. The motor drives the ball screw 3 to rotate. Bearings 6 are disposed in the electric cylinder outer tube 1. The ball screw 3 is connected to the electric cylinder outer tube 1 through the bearings 6. The ball screw nut 5 is matched with the ball screw 3 and the ball screw nut 5 is installed at a lower end of the ball screw 3. The electric cylinder piston 4 is installed at the upper end of the electric cylinder inner tube 2. The electric cylinder piston 4 is disposed between the electric cylinder outer tube 1 and the electric cylinder inner tube 2. The motor drives the ball screw 3 to rotate, then the ball screw 3 rotates relative to the ball screw nut 5, thereby driving the electric cylinder outer tube 1 to move up and down relative to the electric cylinder piston 4. A lower end of the electric cylinder inner tube 2 is internally provided with an oil pool 7. Lubricating oil in the oil pool 7 is pumped to the bearings 6 by an oil pump for cooling and lubrication. A part of the lubricating oil flows back to the oil pool 7 along the ball screw 3, and another part of the lubricating oil leaks between the electric cylinder piston 4 and an inner wall of the electric cylinder outer tube 1.

To solve the above problem, the disclosure provides an electric cylinder driving device as shown in FIG. 2 to FIG. 5. The electric cylinder piston 4 is provided with an elastic oil scraping device. The elastic oil scraping device is configured to intercept lubricating oil leaking between the electric cylinder piston 4 and an inner wall of the electric cylinder outer tube 1, thereby preventing the lubricating oil from leaking to the outside of the electric cylinder outer tube 1. Inevitably, some lubricating oil may still leak from the elastic oil scraping device, and therefore an oil collection device is installed at a bottom of the electric cylinder outer tube 1. The oil collection device is configured to recycle the leaked lubricating oil.

Specifically, the elastic oil scraping device includes an oil scraping ring 8. The oil scraping ring 8 is made of polytetrafluoroethylene (PTFE) mixed with copper powder. The electric cylinder piston 4 defines an annular groove 9, and the oil scraping ring 8 is installed in the annular groove 9. The oil scraping ring 8 is attached to the inner wall of the electric cylinder outer tube 1, and the oil scraping ring 8 is configured to intercept lubricating oil leaking between the electric cylinder piston 4 and the inner wall of the electric cylinder outer tube 1.

In order to facilitate the lubricating oil intercepted by the oil scraping ring 8 to return to the oil pool 7, an oil returning groove 10 is defined on the electric cylinder piston 4, and the oil returning groove 10 is defined above the annular groove 9. Two ends of the oil returning groove 10 penetrate through an inner side and an outer side of the electric cylinder piston 4. The electric cylinder inner tube 2 defines an oil returning hole 11 corresponding to the oil returning groove 10. The intercepted lubricating oil flows from the oil returning groove 10 to the oil returning hole 11 and then returns to the oil pool 7. In order to facilitate the lubricating oil to flow to the oil returning hole 11, the oil returning groove 10 is disposed obliquely, and an end of the oil returning groove 10 located at the outer side of the electric cylinder piston 4 is higher than another end of the oil returning groove 10 connected to the oil returning hole 11.

During use, long-term friction between the oil scraping ring 8 and the inner wall of the electric cylinder outer tube 1 can cause wear. Therefore, an elastic O-shaped ring 12 is also installed in the annular groove 9. The elastic O-shaped ring 12 is made of silicone rubber material, and the oil scraping ring 8 is sleeved on the elastic O-shaped ring 12. Once the oil scraping ring 8 is worn, elastic forces of the elastic O-shaped ring 12 will compensate the wear of the oil scraping ring 8 and improve a service life of the oil scraping ring 8.

Specifically, the oil collection device includes an oil receiving tray 13 and an oil collection pot 14. The oil receiving tray 13 is installed at the lower end of the electric cylinder outer tube 1. The oil receiving tray 13 defines a central hole 15 and an oil collection groove 16. The central hole 15 is located in a middle of the oil receiving tray 13. The electric cylinder inner tube 2 penetrates through the central hole 15 in a clearance fit manner. The oil collection groove 16 is axially disposed around the central hole 15. The oil collection pot 14 is installed at a side of a lower end of the oil receiving tray 13. The oil collection groove 16 is communicated with the oil collection pot 14. The oil collection pot 14 is a vacuum pump filter, and its model is the vacuum pump filter produced by Wenzhou Lanxing Electromechanical Equipment Co., Ltd.

During use, the oil receiving tray 13 will move up and down relative to the outer wall of the electric cylinder inner tube 2, that is, the inner wall of the central hole 15 moves relative to the outer wall of the electric cylinder inner tube 2. In order to facilitate collecting lubricating oil between the electric cylinder piston 4 and the inner wall of the electric cylinder outer tube 1 by the oil receiving tray 13 into the oil collection groove 16, an annular slope structure 17 is disposed at an upper end of the central hole 15, a side of the annular slope structure 17 near the electric cylinder inner tube 2 is higher than another side of the annular slope structure 17 near the oil collection groove 16. Lubricating oil flows from the annular groove 17 to the oil collection groove 16, and then the lubricating oil is recovered into the oil collection pot 14.

Figure 6:
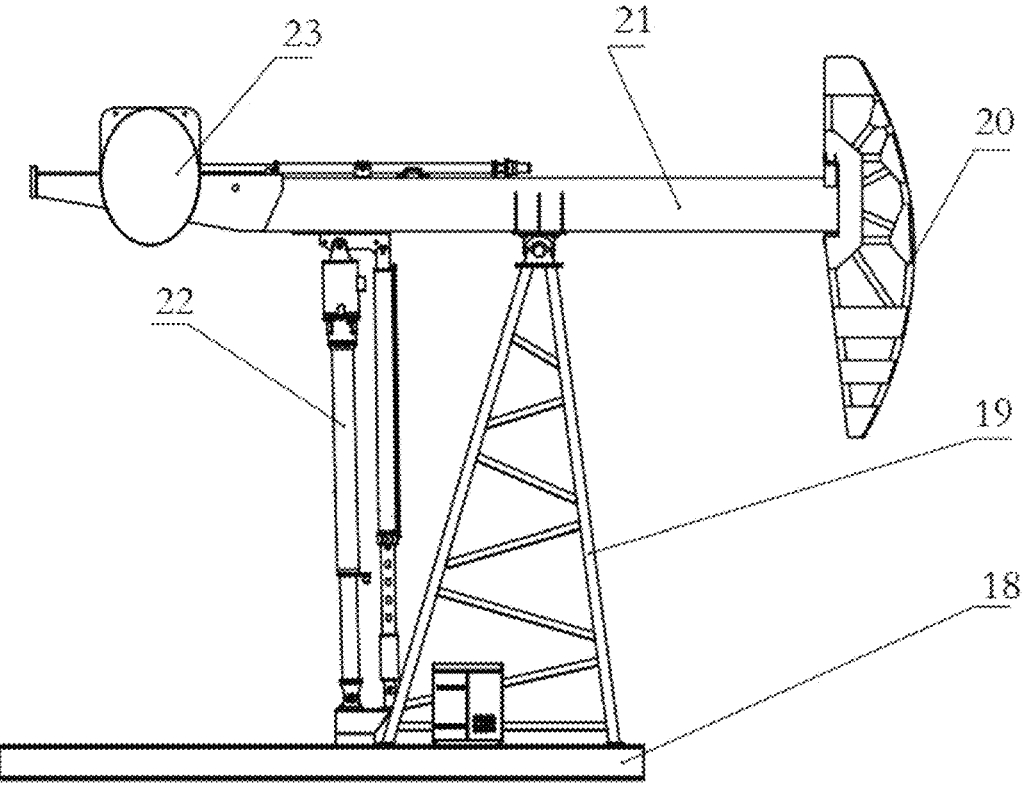
FIG. 6 illustrates a structural schematic diagram of a walking beam pumping unit of the disclosure.

When the electric cylinder driving device 22 of the disclosure is applied in a walking beam pumping unit, as shown in FIG. 6, the walking beam pumping unit includes a base 18, a frame 19, a horsehead 20, a walking beam 21, the electric cylinder driving device 22, and a counterweight 23. The frame 19 is installed on the base 18, and the frame 19 is installed under a middle of the walking beam 21. The horsehead 20 is installed at an end of the walking beam 21. The counterweight 23 is installed at another end of the walking beam 21. The electric cylinder driving device 22 is connected between the walking beam 21 and the base 18. The electric cylinder driving device 22 is configured to drive the horsehead 20 installed at the end of the walking beam 21 to move up and down.

These embodiments are only a further explanation of the disclosure and are not limitations of the disclosure. Those skilled in the art may make non-creative modifications to the embodiments as needed after reading this specification, but as long as the modifications fall within the scope of the claims of the disclosure, the modifications should be protected by the patent law.

What is claimed is:

1. An electric cylinder driving device, comprising: an electric cylinder outer tube, an electric cylinder inner tube, a ball screw, an electric cylinder piston, a ball screw nut, and an elastic oil scraping device;
   wherein the electric cylinder outer tube is sleeved on the electric cylinder inner tube, the ball screw nut is installed in an upper end of the electric cylinder inner tube, an end of the ball screw is movably connected in the electric cylinder outer tube, and another end of the ball screw matched with the ball screw nut is inserted into the electric cylinder inner tube; the electric cylinder piston is disposed between the electric cylinder outer tube and the electric cylinder inner tube; a lower end of the electric cylinder inner tube is internally provided with an oil pool; the elastic oil scraping device is installed on the electric cylinder piston, and the elastic oil scraping device is disposed between the electric cylinder piston and an inner wall of the electric cylinder outer tube.

2. The electric cylinder driving device as claimed in claim 1, wherein the electric cylinder driving device further comprises: an oil collection device, disposed on a lower end of the electric cylinder outer tube.

3. The electric cylinder driving device as claimed in claim 1, wherein the elastic oil scraping device comprises an oil scraping ring, the electric cylinder piston defines an annular groove, the oil scraping ring is installed in the annular groove, and the oil scraping ring is attached to the inner wall of the electric cylinder outer tube.

4. The electric cylinder driving device as claimed in claim 3, wherein the electric cylinder piston defines an oil returning groove, and the oil returning groove penetrates through an inner side and an outer side of the electric cylinder piston; the electric cylinder inner tube defines an oil returning hole corresponding to the oil returning groove, the oil returning groove is connected to the oil pool through the oil returning hole, and the oil returning groove is disposed above the annular groove.

5. The electric cylinder driving device as claimed in claim 4, wherein the oil returning groove is disposed obliquely, and an end of the oil returning groove located at the outer side of the electric cylinder piston is higher than another end of the oil returning groove connected to the oil returning hole.

6. The electric cylinder driving device as claimed in claim 3, wherein the elastic oil scraping device further comprises an elastic O-shaped ring, the elastic O-shaped ring is installed in the annular groove, and the oil scraping ring is sleeved on the elastic O-shaped ring.

7. The electric cylinder driving device as claimed in claim 2, wherein the oil collection device comprises an oil receiving tray and an oil collection pot; the oil receiving tray is installed at the lower end of the electric cylinder outer tube; the oil receiving tray defines a central hole and an oil collection groove; the central hole is located in a middle of the oil receiving tray; the electric cylinder inner tube penetrates through the central hole in a clearance fit manner; the oil collection groove is axially disposed around the central hole; the oil collection pot is installed at a side of a lower end of the oil receiving tray; and the oil collection groove is communicated with the oil collection pot.

8. The electric cylinder driving device as claimed in claim 7, wherein the oil collection pot is a vacuum pump filter.

9. The electric cylinder driving device as claimed in claim 7, wherein the oil receiving tray comprises an annular slope structure disposed at an upper end of the central hole; and a side of the annular slope structure near the electric cylinder inner tube is higher than another side of the annular slope structure near the oil collection groove.

10. A walking beam pumping unit, comprising: a base, a frame, a horsehead, a walking beam, the electric cylinder driving device as claimed in claim 1, and a counterweight;
    wherein the frame is installed on the base, and the frame is installed under a middle of the walking beam; the horsehead is installed at an end of the walking beam, the counterweight is installed at another end of the walking beam, the electric cylinder driving device is connected between the walking beam and the base, and the electric cylinder driving device is configured to drive the horsehead installed at the end of the walking beam to move up and down.

11. The walking beam pumping unit as claimed in claim 10, wherein an annular groove is defined on the electric cylinder piston, and the elastic oil scraping device is disposed in the annular groove.

12. The walking beam pumping unit as claimed in claim 11, wherein the oil scraping device comprises an oil scraping ring disposed in the annular groove, and the oil scraping ring is in contact with the electric cylinder outer tube.

13. The walking beam pumping unit as claimed in claim 12, wherein the oil scraping device further comprises an elastic O-shaped ring disposed in the annular groove; a side of the oil scraping ring is disposed in the annular groove and is in contact with the elastic O-shaped ring, and another side of the oil scraping ring is disposed in a gap between the electric cylinder piston and the electric cylinder outer tube and is in contact with the electric cylinder outer tube.

14. The walking beam pumping unit as claimed in claim 13, wherein the electric cylinder piston defines an oil returning groove disposed above the elastic oil scraping device, the oil returning groove penetrates through the electric cylinder piston, and the oil returning groove is configured to connect the gap and an interior of the electric cylinder inner tube.

15. The walking beam pumping unit as claimed in claim 14, wherein the electric cylinder inner tube defines an oil returning hole, and the oil returning groove is connected to the oil returning hole to make the gap connect with the interior of the electric cylinder inner tube.

16. The walking beam pumping unit as claimed in claim 10, wherein the electric cylinder driving device further comprises: an oil collection device, disposed on a lower end of the electric cylinder outer tube and located outside the electric cylinder inner tube.

17. The walking beam pumping unit as claimed in claim 16, wherein the oil collection device comprises an oil receiving tray and an oil collection pot; the oil receiving tray is disposed on the lower end of the electric cylinder outer tube and surrounds the electric cylinder inner tube; and the oil collection pot is disposed on a side of the oil receiving tray.

18. An electric cylinder driving device, comprising: an electric cylinder outer tube, an electric cylinder inner tube, a ball screw, an electric cylinder piston, a ball screw nut, an oil scraping device, and an oil collection device;

wherein the ball screw, the ball screw nut, the electric cylinder inner tube, and the electric cylinder piston are sequentially arranged in the electric cylinder outer tube from inside to outside; the oil scraping device is disposed between the electric cylinder outer tube and the electric cylinder piston, and the oil collection device is disposed on a lower end of the electric cylinder outer tube and located at an outer side of the electric cylinder inner tube.

19. The electric cylinder driving device as claimed in claim 18, wherein an annular groove is defined on a side of the electric cylinder piston near the electric cylinder outer tube; the oil scraping device comprises an elastic O-shaped ring and an oil scraping ring, the elastic O-shaped ring is disposed in the annular groove, a side of the oil scraping ring contacts the elastic O-shaped ring, and another side of the oil scraping ring contacts an inner wall of the electric cylinder outer tube.

20. The electric cylinder driving device as claimed in claim 18, wherein the oil collection device comprises an oil receiving tray and an oil collection pot; the oil receiving tray defines a central hole and an oil collection groove surrounding the central hole, the electric cylinder inner tube penetrates through the central hole, and the oil collection groove is connected to the oil collection pot.

\* \* \* \* \*